United States Patent
Pratt et al.

(10) Patent No.: US 11,578,294 B2
(45) Date of Patent: Feb. 14, 2023

(54) METHOD FOR PREPARING A NEUTRAL MALT BASE

(71) Applicants: Jason S. Pratt, Denver, CO (US); David S. Ryder, Mequon, WI (US); Anthony J. Manuele, Brookfield, WI (US); John C. Hensley, Milwaukee, WI (US); George A. Williams, Whitefish Bay, WI (US)

(72) Inventors: Jason S. Pratt, Denver, CO (US); David S. Ryder, Mequon, WI (US); Anthony J. Manuele, Brookfield, WI (US); John C. Hensley, Milwaukee, WI (US); George A. Williams, Whitefish Bay, WI (US)

(73) Assignee: MOLSON COORS BEVERAGE COMPANY USA LLC, Wilmington, DE (US)

( * ) Notice: Subject to any disclaimer, the term of this patent is extended or adjusted under 35 U.S.C. 154(b) by 0 days.

(21) Appl. No.: 13/670,584

(22) Filed: Nov. 7, 2012

(65) Prior Publication Data
US 2014/0127354 A1    May 8, 2014

(51) Int. Cl.
C12G 3/02 (2019.01)
C12G 3/022 (2019.01)

(52) U.S. Cl.
CPC ................... *C12G 3/022* (2019.02)

(58) Field of Classification Search
CPC . Y02E 50/17; Y02E 50/16; C12P 7/06; C12G 3/02; C12C 5/00; C12C 11/003
USPC ........................................ 426/592
See application file for complete search history.

(56) References Cited

U.S. PATENT DOCUMENTS

| | | | |
|---|---|---|---|
| 3,484,244 A | 12/1969 | Kozulis et al. | |
| 3,720,515 A * | 3/1973 | Stanley | 430/313 |
| 3,720,517 A | 3/1973 | Bavisotto et al. | |
| 3,798,331 A | 3/1974 | Bavisotto et al. | |
| 3,908,021 A | 9/1975 | Rehberger et al. | |
| 3,979,527 A | 9/1976 | Laws et al. | |
| 4,021,580 A | 5/1977 | Raymond et al. | |
| 4,180,589 A | 12/1979 | Chicoye et al. | |
| 4,409,246 A | 10/1983 | Stewart et al. | |
| 4,440,795 A | 4/1984 | Goldstein et al. | |
| 4,495,204 A | 1/1985 | Weaver et al. | |
| 4,721,621 A | 1/1988 | Geiger | |
| 4,816,280 A | 3/1989 | Billings | |
| 4,929,452 A | 5/1990 | Hamdy | |
| 4,971,808 A | 11/1990 | Takeda et al. | |
| 5,294,450 A | 3/1994 | Word et al. | |
| 5,618,572 A | 4/1997 | Tripp et al. | |
| 5,972,411 A | 10/1999 | Goldstein et al. | |
| 7,008,652 B2 | 3/2006 | Effler | |
| 7,670,828 B2 | 3/2010 | Nakao et al. | |
| 8,263,165 B2 | 9/2012 | Sher | |
| 2004/0241281 A1* | 12/2004 | Ramsden | 426/11 |
| 2005/0064066 A1* | 3/2005 | Ramsden | 426/11 |
| 2006/0105078 A1* | 5/2006 | Kuroda | C12C 1/00 426/11 |
| 2017/0260486 A1 | 9/2017 | Ottens et al. | |

FOREIGN PATENT DOCUMENTS

| | | | |
|---|---|---|---|
| CN | 102329743 A | * | 1/2012 |
| GB | 1472980 A | * | 5/1977 |

OTHER PUBLICATIONS

De Keukeleire, Denis. "Fundamentals of Beer and Hop Chemistry." Quimica Nova, 23(1): 2000, pp. 108-112.

* cited by examiner

*Primary Examiner* — Vera Stulii
(74) *Attorney, Agent, or Firm* — Quarles & Brady LLP

(57) ABSTRACT

A method for preparing a neutral alcoholic malt base is disclosed. The method includes the steps of combining malt extract, which can be derived from malted grains containing gluten, or from those that are gluten-free, fermentable sugar in liquid or solid form, and water to form a fermentable medium having a density of greater than 20° Plato, wherein a ratio of the malt extract to the fermentable sugar in the fermentable medium is from 5:95 to 0.1:99.9; and fermenting the fermentable medium with a yeast that can tolerate an alcohol concentration of at least 10% by volume thereby preparing the neutral alcoholic malt base. A flavored malt beverage can include the neutral alcoholic malt base, water, at least one flavoring, a food grade acid, a sweetening agent, and carbon dioxide.

30 Claims, No Drawings

METHOD FOR PREPARING A NEUTRAL MALT BASE

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to a method for preparing a neutral alcoholic malt base that can be used in making a flavored malt beverage. The neutral malt base derives a portion of its fermentable sugar from the extract of a malted cereal grain. In cases where an extract of gluten-free grains is used, this neutral alcoholic base is gluten-free, and can be used to make gluten-free flavored malt beverages.

2. Description of the Related Art

Neutral malt alcoholic bases have been used to make flavored malt beverages. A neutral malt alcoholic base should not have any flavor that interferes with the flavor profile of the final flavored malt beverage. In addition, a neutral malt alcoholic base should have a reduced color compared to a beer.

Typically, methods for the production of a neutral malt alcoholic base require post fermentation processing in order to produce a neutral malt base that is reduced in malt flavor and color. Example post fermentation processes include: ultrafiltration (see U.S. Pat. No. 5,618,572); membrane filtration (see U.S. Pat. No. 4,440,795); and activated carbon or sepiolite treatment (see U.S. Pat. No. 5,294,450). These procedures can be costly and time consuming.

Sulfites include a range of compounds, most notably sulfur dioxide which is generated as a natural by-product of yeast fermentation. Sulfites have been generally regarded as safe (GRAS) by the FDA; however, it has been suggested that a small percentage of the population is sensitive to sulfites. According to TTB regulations, malt based beverages require label declaration for products containing greater than 10 ppm sulfur dioxide with 25 ppm as a maximum. Therefore, a preferred method for the production of neutral malt alcoholic base would mitigate any potential risk of high levels of sulfur dioxide.

In addition, prior methods for the production of neutral malt alcoholic base lacked flexibility to make flavored malt beverages with a wide range of alcohol and carbon dioxide targets.

Therefore, there exists a need for an improved method for the production of a neutral malt alcoholic base.

SUMMARY OF THE INVENTION

The invention is a method by which a neutral malt base is produced by the fermentation of a fermentable medium including a malt extract, which could be either gluten-containing or gluten-free depending on the grain source, and fermentable sugar (e.g., dextrose) wherein 0.1-5% of the combination of malt extract and dextrose is malt extract and 95-99.9% is fermentable sugar. This method employs yeast that is capable of fermenting very high gravity wort (greater than 20° Plato). The resultant neutral malt alcoholic base is a low color, low flavor malt base for the production of flavored malt beverages. This neutral base requires less post fermentation processing, and provides a number of advantages when compared to current methods of producing a neutral malt alcoholic base.

The invention provides marked improvements and advantages in a number of areas including: cost reduction, process streamlining, quality improvement, new product development potential, and increased production capacity.

Regarding process improvement, the method provides a streamlined brewing process in which: (i) post fermentation color/flavor reduction is unnecessary; (ii) the mash tun and lauter tun are not required, thus shortening the time/energy usage in the brewhouse; (iii) the kettle boiling time is reduced; (iv) the process has a faster fermentation time (4-10 days) which allows for quicker fermenter turnover and tank space availability; and (v) typically used specialty brewing materials such as flavored malt beverage malts, enzymes, kettle salts (e.g., dibasic ammonium phosphate), and carbon are not required.

With respect to quality improvement, (i) the neutral malt alcoholic base produced by the method of the invention has a color that meets product quality requirements without the need for post fermentation processing; (ii) the neutral malt alcoholic base has a greater alcohol yield, a lower extract/alcohol ratio, with less residual sugar, enabling finished products with fewer calories, and potentially improved drinkability; (iii) the neutral malt alcoholic base has low foaming potential (a desired characteristic in flavored malt beverages) which eliminates the need for antifoaming agents to be added to the method; and (iv) the neutral malt alcoholic base has a lower protein content, leading to less haze potential in the finished product.

Regarding new product development potential, a neutral malt alcoholic base produced by the method of the invention provides an excellent neutral flavor and low color base for unique products, without expensive capital improvements at a brewery.

With respect to capacity improvement, (i) brewing at a higher Plato provides for improved brewing vessel utilization; (ii) the method of the invention allows for increased fermenter fills due to low foaming potential; and (iii) higher brewed alcohol in the method improves the ability to hit final product alcohol target.

It is one advantage of the present invention to provide a method for the production of a neutral malt alcoholic base wherein the method has reduced cost and production time compared to prior methods.

It is another advantage of the present invention to provide a method for the production of a neutral malt alcoholic base wherein the method mitigates any potential risk of high levels of sulfur dioxide.

It is yet another advantage of the present invention to provide a method for the production of a neutral malt alcoholic base wherein the method allows breweries the flexibility to comfortably hit targets for carbonation and alcohol in the final flavored malt beverage.

It is yet another advantage of the present invention to expand the breweries capabilities to produce a wider range of innovative products, including those containing higher alcohol levels.

It is yet another advantage of the present invention to allow breweries to produce a gluten-free neutral malt base and resulting gluten-free flavored malt beverage products provided the base is brewed with gluten-free malt extract.

These and other features, aspects, and advantages of the present invention will become better understood upon consideration of the following detailed description and appended claims.

DETAILED DESCRIPTION OF THE INVENTION

The invention provides a method for preparing a neutral alcoholic malt base. In one example version of the method, malt extract, dextrose, and water are combined to form a fermentable medium having a density of greater than 20° Plato. A ratio of the malt extract to the fermentable sugar in the medium can be from 5:95 to 0.1:99.9, or from 4:96 to 0.1:99.9, or from 3:97 to 0.1:99.9, or from 2:98 to 0.1:99.9, or about 0.1:99.9. The fermentable medium can have a density of at least 21° Plato, or a density of at least 35° Plato. The malt extract and the fermentable sugar may comprise less than 35% by weight of the fermentable medium, or more than 20% by weight of the fermentable medium. The fermentable medium may include at least 0.0001-0.001% by weight of a hop product, such as hop oil fraction. Preferably, the fermentable medium consists essentially of malt extract, fermentable sugar, water, and hop oil fraction in order to avoid unwanted flavors and colors in the neutral alcoholic malt base. Brewing adjustment salts (such as calcium sulfate, calcium chloride, and ammonium phosphate) are not added to the fermentable medium.

Malt extract is commercially available. It can be prepared by producing a nutrient filled wort by normal brewing procedures. The liquid produced is then concentrated to evaporate water and form malt extract, which is available in liquid or dry form. Malt extracts can also be produced from grains such as barley, wheat and rye, or from gluten-free grains, including, but not limited to sorghum, rice or millet.

In one version of the method, the malt extract and the water are boiled together for ten to sixty minutes, and thereafter the fermentable sugar is added to form the fermentable medium. This avoids any unwanted changes to the fermentable sugar that may be caused by boiling. Boiling time can also be ten to fifty minutes, or ten to forty minutes, or ten to thirty minutes, or ten to twenty minutes. It is also possible to add the fermentable medium directly to the fermenter with no boiling.

After combining the malt extract, fermentable sugar, and water, the fermentable medium is fermented with a yeast strain that can tolerate an alcohol concentration of at least 12% by volume thereby preparing the neutral alcoholic malt base. Preferably, the temperature of fermentation is controlled to be in the range of 70° F. to 85° F. The fermentation time can be four to ten days. In one version of the method, the yeast strain can tolerate an alcohol concentration of at least 15% by volume. In another version of the method, the yeast strain can tolerate an alcohol concentration of at least 23% by volume. High alcohol tolerant yeast strains are commercially available from a number of sources. By the term "tolerant", we mean the yeast can survive at a certain alcohol concentration. The yeast can be selected from *Saccharomyces cerevisiae* and *Saccharomyces pastorianus*. Optionally, a nutrient mix of nitrogen, vitamins and/or minerals can be added with the yeast.

The neutral alcoholic malt base obtained preferably has a sulfite level of less than 25 ppm, and most preferably less than 10 ppm.

The neutral alcoholic malt base obtained preferably has a color measured using the Standard Reference Method of 0.3 or less, and most preferably 0.2 or less. The method of the invention achieves these color levels without using ultrafiltration, membrane filtration, activated carbon treatment or other processes.

The neutral alcoholic malt base obtained preferably has an extract/alcohol ratio of less than 0.4, more preferably less than 0.3, and most preferably less than 0.2.

The neutral alcoholic malt base obtained preferably has a bitterness as measured by the International Bitterness Units scale of 1 or less.

The neutral alcoholic malt base obtained preferably has an alcohol by volume of 10% or more, and more preferably 15% or more. The alcohol by volume can also be 20% or more.

The invention also provides a flavored malt beverage comprising a neutral alcoholic malt base prepared by method of the invention, additional water, at least one flavoring, an optional sweetening agent, an optional food grade acid, and carbon dioxide. The alcohol content of the flavored malt beverage can be controlled by the amount of water added to the neutral malt alcoholic base, and the approximate alcohol content of the flavored malt beverage may be 0.5 to 23.0% by volume, more preferably 3.0 to 10.0% by volume, and most preferably 4.0 to 8.0% by volume.

The following Examples are presented for purposes of illustration and not of limitation.

EXAMPLES

1. Preparation of A Neutral Malt Base

A mixture was prepared including 445 lbs. liquid malt extract (79% solids), 0.4 lbs. hop oil fraction, and 120 bbl. water. Hop oil fraction is commercially available, and can be prepared by removing α-acids and β-acids from a liquid/supercritical $CO_2$ extract of hops. The mixture was boiled for 15 minutes. Then 9500 lbs. of liquid dextrose (71% solids) was added to a stream of the boiled mixture and the stream was fed through a heat exchanger to cool the mixture to 75° F. It was pitched at about 360 grams/hectoliter with *Saccharomyces cerevisiae* having alcohol tolerance greater than 20%, and fermented at a temperature in the range of 75° F. to 79° F. About 108 hours were required to complete the fermentation. The resulting neutral malt alcoholic base obtained had 15.7% alcohol by volume; had a low measureable color (0.13° SRM), had a sulfite level of 6.1 ppm, had a density of −3.5° Plato; had a bitterness as measured on the International Bitterness Units scale of less than 1; had an extract/alcohol ratio of 0.19; and had a specific gravity of 0.98653.

2. Preparation of A Flavored Malt Beverage

A flavored malt beverage can be prepared by combining the neutral malt alcoholic base prepared in Example 1 with additional water, at least one flavoring, an optional sweetening agent, an optional food grade acid, and carbon dioxide. The alcohol content of the flavored malt beverage can be controlled by the amount of water added to the neutral malt alcoholic base, and the approximate alcohol content of the flavored malt beverage may be 0.5. to 23.0% by volume, more preferably 3.0 to 10.0% by volume, and most preferably 4.0 to 8.0% by volume. Preservatives (e.g., sorbic acid and its salts, and benzoic acid and its salts) and food grade colorants may also be used in the flavored malt beverage.

Non-limiting example flavorings include any fruit, quinine, tea, coffee, guarana nut, chocolate, licorice, fruit juice, anise, root beer, cola, or exotic/cola, flavors, and combinations thereof. Preferred flavorings are quinine, loganberry, blackberry, punch, tea, apple, orange, yuzu, lemon, grapefruit, and lime. Generally speaking, any flavoring can be used in preparing a flavored malt beverage from the neutral malt alcoholic base of the present invention if the flavoring is organoleptically compatible with the neutral malt alcoholic base of the present invention.

The food grade acid is used to provide acceptable flavor profiles. Non-limiting example food grade acids include malic acid, citric acid, phosphoric acid, tartaric acid, and combinations thereof.

Various ranges of the ingredients in the flavored malt beverage are suitable. For example, the neutral malt alcoholic base may be 1-100% by weight, or 50-90% by weight, or more preferably 70-80% by weight of the flavored malt beverage; additional water may be 8-30% by weight or more preferably 15-25% by weight of the flavored malt beverage; the one or more flavorings may be 0.01-1% by weight of the flavored malt beverage; the sweetening agent may be 1-10% by weight or more preferably 3-7% by weight of the flavored malt beverage; the food grade acid may be 0.01-1% by weight of the flavored malt beverage; and the flavored malt beverage may have 0 to 3.5% v/v $CO_2$, wherein % $CO_2$ v/v means the difference in liquid sample volume after the $CO_2$ is precipitated out as a carbonate.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for preparing a neutral alcoholic malt base, the method comprising:
   (a) combining commercially available malt extract, fermentable sugar, and water to form a fermentable medium having a density of greater than 20° Plato, wherein a ratio of the malt extract to the fermentable sugar in the medium is from 4:96 to 0.1:99.9; and
   (b) fermenting the fermentable medium with a yeast strain that can tolerate an alcohol concentration of at least 12% by volume thereby preparing the neutral alcoholic malt base,
   wherein the neutral malt alcoholic base has an extract/alcohol ratio of less than 0.4, and
   wherein brewing adjustment salts are not added to the fermentable medium, and
   wherein the method does not use a mash tun.

2. The method of claim 1 wherein:
the ratio of the malt extract to the fermentable sugar in the fermentable medium is about 1:99.

3. The method of claim 1 wherein:
the malt extract is derived from a cereal grain containing gluten.

4. The method of claim 1 wherein:
the malt extract is derived from a cereal grain that is gluten-free.

5. The method of claim 1 wherein:
the fermentable sugar is dextrose.

6. The method of claim 1 wherein:
the malt extract and the fermentable sugar comprise more than 20% by weight of the fermentable medium.

7. The method of claim 1 wherein:
the yeast strain can tolerate an alcohol concentration of at least 15% by volume.

8. The method of claim 1 wherein:
the yeast strain can tolerate an alcohol concentration of at least 23% by volume.

9. The method of claim 1 wherein:
the neutral alcoholic malt base has a sulfite level of less than 25 ppm.

10. The method of claim 1 wherein:
the neutral alcoholic malt base has a sulfite level of less than 10 ppm.

11. The method of claim 1 wherein:
the yeast strain is selected from *Saccharomyces cerevisiae* and *Saccharomyces pastorianus*.

12. The method of claim 1 wherein:
the fermentable medium has a density of at least 25° Plato before step (b).

13. The method of claim 1 wherein:
the fermentable medium has a density of at least 30° Plato before step (b).

14. The method of claim 1 wherein:
the fermentable medium has a density of at least 35° Plato before step (b).

15. The method of claim 1 wherein:
the neutral alcoholic malt base has a color measured using Standard Reference Method of 0.3 or less, the color being achieved without using ultrafiltration, membrane filtration, or activated carbon treatment.

16. The method of claim 1 wherein:
the fermentable medium consists essentially of malt extract, fermentable sugar, water, and a hop product.

17. The method of claim 1 wherein:
the neutral alcoholic malt base can be produced with the flexibility to produce a bitterness as measured by the International Bitterness Units scale of 1 or less.

18. The method of claim 1 wherein:
the neutral malt alcoholic base has an alcohol by volume of 10% or more.

19. The method of claim 1 wherein:
step (b) comprises fermenting the fermentable medium at a temperature of 70° F. to 85° F.

20. The method of claim 1 wherein:
step (a) comprises boiling the malt extract and the water and thereafter adding the fermentable sugar to form the fermentable medium.

21. The method of claim 1 wherein:
step (a) comprises boiling the malt extract, the water and the fermentable sugar to form the fermentable medium.

22. The method of claim 1 wherein:
step (a) comprises adding the malt extract, the water and the fermentable sugar to form the fermentable medium directly in a fermenter without boiling.

23. A flavored malt beverage comprising:
a neutral alcoholic malt base prepared by a method comprising (i) combining commercially available malt extract, fermentable sugar, and water to form a fermentable medium having a density of greater than 20° Plato, wherein a ratio of the malt extract to the fermentable sugar in the fermentable medium is from 4:96 to 0.1:99.9, and (ii) fermenting the fermentable medium with a yeast strain that can tolerate an alcohol concentration of at least 10% by volume, wherein the neutral malt alcoholic base has an extract/alcohol ratio of less than 0.4;
additional water; and
one or more flavorings, and
wherein brewing adjustment salts are not added to the fermentable medium, and
wherein the method does not use a mash tun.

24. The flavored malt beverage of claim 21 further comprising:
carbon dioxide.

25. The flavored malt beverage of claim 22 further comprising:
a food grade acid; and
a sweetening agent.

26. The flavored malt beverage of claim 23 wherein:
the neutral malt alcoholic base is 1-100% by weight of the flavored malt beverage,
the additional water is 8-30% by weight of the flavored malt beverage,
the one or more flavorings is 0.01-1% by weight of the flavored malt beverage,
the sweetening agent is 1-10% by weight of the flavored malt beverage,
the food grade acid is 0.01-1% by weight of the flavored malt beverage, and
the flavored malt beverage has 0.0 to 3.5% v/v $CO_2$.

27. The method of claim 1 wherein:
the brewing adjustment salts that are not added to the fermentable medium are calcium sulfate, calcium chloride, and ammonium phosphate.

28. The method of claim 1 wherein:
the method does not use an antifoaming agent.

29. A method for preparing a neutral alcoholic malt base, the method comprising:
(a) combining commercially available malt extract, fermentable sugar, and water to form a fermentable medium having a density of greater than 20° Plato, wherein a ratio of the malt extract to the fermentable sugar in the medium is from 4:96 to 0.1:99.9; and
(b) fermenting the fermentable medium with a yeast strain that can tolerate an alcohol concentration of at least 12% by volume thereby preparing the neutral alcoholic malt base,
wherein the neutral malt alcoholic base has an extract/alcohol ratio of less than 0.4, and
wherein the malt extract is a concentrate produced from wort, and
wherein the method does not use a mash tun.

30. The method of claim 29 wherein:
the malt extract and water are combined in a mixture before boiling the mixture.

* * * * *